(12) United States Patent
Dascalu

(10) Patent No.: US 6,754,713 B1
(45) Date of Patent: *Jun. 22, 2004

(54) SYSTEM AND METHOD OF CONTROLLING COMMUNICATION SESSIONS

(75) Inventor: Ziv Dascalu, Ness Ziona (IL)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/389,357

(22) Filed: Sep. 3, 1999

Related U.S. Application Data

(63) Continuation of application No. 08/739,518, filed on Oct. 29, 1996, now Pat. No. 5,958,015.

(51) Int. Cl.$^7$ ......................... G06F 15/16; G06F 15/173
(52) U.S. Cl. ......................... 709/229; 709/224; 709/227
(58) Field of Search ................................ 709/229, 223, 709/224, 227, 237; 713/200, 201; 711/141, 146

(56) References Cited

U.S. PATENT DOCUMENTS

| | | |
|---|---|---|
| 4,958,270 A | 1/1989 | McLaughlin et al. |
| 4,962,533 A | 10/1990 | Krueger et al. |
| 4,972,317 A | 11/1990 | Buonomo et al. |
| 5,018,096 A | 5/1991 | Aoyama |
| 5,163,147 A | 11/1992 | Orita |
| 5,263,158 A * | 11/1993 | Janis .............................. 707/1 |
| 5,309,437 A | 5/1994 | Perlman et al. |
| 5,313,637 A * | 5/1994 | Rose ........................... 713/200 |
| 5,377,343 A | 12/1994 | Yaezawa |
| 5,386,470 A * | 1/1995 | Carter et al. ................. 713/162 |
| 5,469,556 A | 1/1995 | Carter et al. |
| 5,408,602 A * | 4/1995 | Giokas et al. .............. 345/733 |
| 5,396,609 A | 5/1995 | Schmidt et al. |
| 5,489,896 A * | 2/1996 | Sofer et al. .................. 370/445 |
| 5,499,356 A | 5/1996 | Eckert et al. |
| 5,542,046 A | 7/1996 | Carlson et al. |
| 5,548,746 A | 8/1996 | Carpenter et al. |
| 5,550,984 A * | 8/1996 | Gelb ........................... 709/245 |
| 5,958,015 A * | 9/1999 | Dascalu ....................... 709/229 |

OTHER PUBLICATIONS

SurfWatch from Spyglass; General SurfWatch Operation Questions; .../www.spyglass.com/products/surfwatch/faq.ht. See above;General Surfwatch Operation Questions; .../www.spyglass.com/products/surfwatch/datasheet.ht.
The Washington Post, Sep. 10, 1996, "China Blocks User Access to 100–Plus Sites on Web".

* cited by examiner

Primary Examiner—Mark R. Powell
Assistant Examiner—Jason D. Cardone
(74) Attorney, Agent, or Firm—Cooper & Dunham LLP

(57) ABSTRACT

A session wall for a local area network is provided. This is a device connected to a local area network which listens passively to communications sent over the network. The device also sends data over the network which is interpreted by other devices connected to the network as if it were sent by another network device connected to the local network. The session wall has means for storing access rules for the network devices which generate data communication messages over the local network. It reads a portion of each communication message it listens to and compares that data with the stored access rules to determine whether the message is permitted or not. If not, the session wall sends a message to both parties. In a message to the server it either notifies that the client wishes to close the current session, or it sends a specific message to the server that according to the protocol used causes the server to stop responding to additional client messages in that specific session. In a message to the client the session wall either emulates data from the server causing the client to misinterpret it so future responses from the server for that session will not be accepted properly, or it notifies the client that the server has dropped the connection, or it sends a pre-defined message to notify that the session was blocked.

8 Claims, 1 Drawing Sheet

SYSTEM AND METHOD OF CONTROLLING COMMUNICATION SESSIONS

This is a Continuation Application of U.S. patent application Ser. No. 08/739,518, filed on Oct. 29, 1996, U.S. Pat. No. 5,958,015.

FIELD AND BACKGROUND OF THE INVENTION

The present invention relates to local area networks, and wide area networks which consists of at least one local area network, for providing communication between computers and/or other network connected devices. The communication is based on well known communication rules, known as protocols (a set of rules) known to all parties participating in a session. A session is a conversation between two or more parties using a standard protocol. A party that initiates a session is called "client." A party that is connected to the client and accepts an invitation to join a session is called a "server." A session is always established by a client inviting one or more servers to attend. Additional clients may attend as well.

More particularly, the present invention relates to a method and means for restricting the access of specific clients to specific servers for specific protocols or data content. This is accomplished using a device located on the network and capable of passively listening to network traffic, analyzing it and responding to it when access is to be denied.

Presently, there are a number of solutions available for controlling communications over a network. One such controlling apparatus is a firewall. This is a machine located between an internal network and external networks connected thereto. The only way to communicate outside of the internal network is through the firewall. Therefore, a firewall is known as an active device that is managed for access control, and, in some cases, for authentication and encryption. By placing firewalls at strategic points between network segments, using routers, bridges and repeaters, it is possible to use this technology for access control between network stations located on different network segments. However, this solution is effectively limited, because a server station must reside on a different network segment than the communicating client station in order to monitor the communication. Internal intruders may install their own devices on the segment behind the firewall and thus get unlimited access to all machines inside the secured local area network. Also, because a firewall requires that all network traffic to pass through it and be processed for access control, the firewall causes a degradation in the throughput of the network. Accordingly, a firewall is also known as a network bottleneck.

Other methods for controlling communications over a network are various software products that implement secured protocols which include authentication. Using such software, the client identifies itself either directly or using an authentication trusted server; the server (in the communication) reciprocates by identifying itself as well. Using a pre defined security protocol, both parties either accept or deny the session. This requires both parties to use the same security protocol. This method also carries an implied trust in the authentication server when such a server is employed.

There is therefore a need for, and it would be highly advantageous to have, a passive network device that provides access control at a requested level over a local area network and a wide area network without using conventional software security and authentication methods.

SUMMARY OF THE INVENTION

The present invention is a session wall for monitoring and controlling communications over a computer network.

According to the teachings of the present invention there is provided, a session wall device featuring a network adapter for attaching the session wall to a network, a memory, a processor, all suitably interconnected and a communication session control system. The memory is any medium for data storage, such as, but not limited to Flash memory, conventional magnetic memory disk or diskette, and Read Only Memory (ROM). The processor functions to perform the various tasks associated with the network session control system. The network adapter is any hardware component enabling network communication between a session wall device and another network device. According to a preferred embodiment, the network adapter receives communications in several protocols simultaneously and transmits messages in several protocols.

The communication session control system features data pertinent to the control of communication between network devices, stored in the memory. This data includes network information and access information. Network information includes information regarding the network, such as network topology, defining which network devices are servers and which are clients and defining the communication protocols between network devices. Access information is a set of rules typically realized as a table of groups of servers, groups of clients, and rules between them. The rules define actions that should take place when a specific set of protocols are used when the two or more parties communicate, and optionally, specific data content, or specific data sequences to be passed over the network. According to further features in preferred embodiments of the invention, the rules contain logical and mathematical combinations according to which a specific action is to be performed.

The session control system passively listens to communications traversing the network and reads a portion of each communication. It then compares the data read with the access data in order to determine whether the message is permitted or not. If the communication is not allowed, the session wall issues a message to at least one of the devices involved in the communication. The term 'listen' in the context of the present invention is directed at the process of an electronic device receiving data communication. Thus, the term 'passive listening' is directed at an electronic device receiving data communication not designated for the device without interfering in any way with the transmission of that communication to its intended destination.

According to further features in preferred embodiments of the invention described below, the device to which the message is sent is a client.

According to further features in preferred embodiments of the invention, the message issued features either an emulated message from a respective server, a notice that a respective server has ended the session, or a notice that the session has been blocked, or any combination thereof.

According to further features in preferred embodiments of the invention, the device to which the message is sent is a server.

According to further features in preferred embodiments of the invention, the message sent to the server features either an emulated message from a respective client to end the current session or a data string causing the server not to respond to additional messages from the respective client in the current session, or both.

According to still further features in preferred embodiments of the invention described below, the session wall issues two different messages: one to the client and another to the server.

According to further features in preferred embodiments of the invention described below, when the session wall fails to issue an appropriate message, it issues a succession of communication messages (conforming to the appropriate system protocol) in order to block transmission by another network device. A further feature according to this embodiment is to provide a timer configured to limit the number of consecutive messages sent in order not to block the network indefinitely. The timer is realized either as a separate device, or as software executed by the processor.

According to the teachings of the present invention, there is also provided a method for controlling communication between network devices including the steps of:

(a) providing network information;

(b) providing access information;

(c) reading portions of communication traversing the network;

(d) comparing the read communication with the access information; and (e) when the communication is not allowed according to the access information, issuing any of the aforementioned messages to an appropriate network device involved in the communication.

According to further features in preferred embodiments of the invention, the method further includes providing the network information using one of the aforementioned methods for providing network information.

According to still further features in preferred embodiments of the invention described below, access information is provided by having the session wall passively listen to network traffic and allowing all active communication links.

According to further features in preferred embodiments of the invention, the method further features the step of, when a message is not issued as it should have been, issuing a succession of communication messages in order to block transmission by another network device. According to still further features in this preferred embodiment, the succession is limited in order not to block the network indefinitely.

According to further features in preferred embodiments of the invention, there is provided a method wherein a plurality of network devices are provided, each device capable of performing each of the steps in the method outlined above, and further providing a communication protocol for communication between these devices. The different steps involved in the method described above are executed by various of the session wall devices, whereby the devices coordinate by communicating with each other using the above mentioned protocol.

According to still further features in preferred embodiments of the invention, the above mentioned configuration is employed as a back-up. Accordingly, the plurality of devices are located on a single network segment. When one device does not function properly, another of the devices automatically operates in its stead.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a session wall device connected to a local area network for passively listening to communication sent over the network, and for generating messages to various network devices. When received, these messages are interpreted as messages sent either by the session wall or by another network device.

The principles and operation of the session wall according to the present invention may be better understood with reference to the drawings and the accompanying description.

Figure 1:
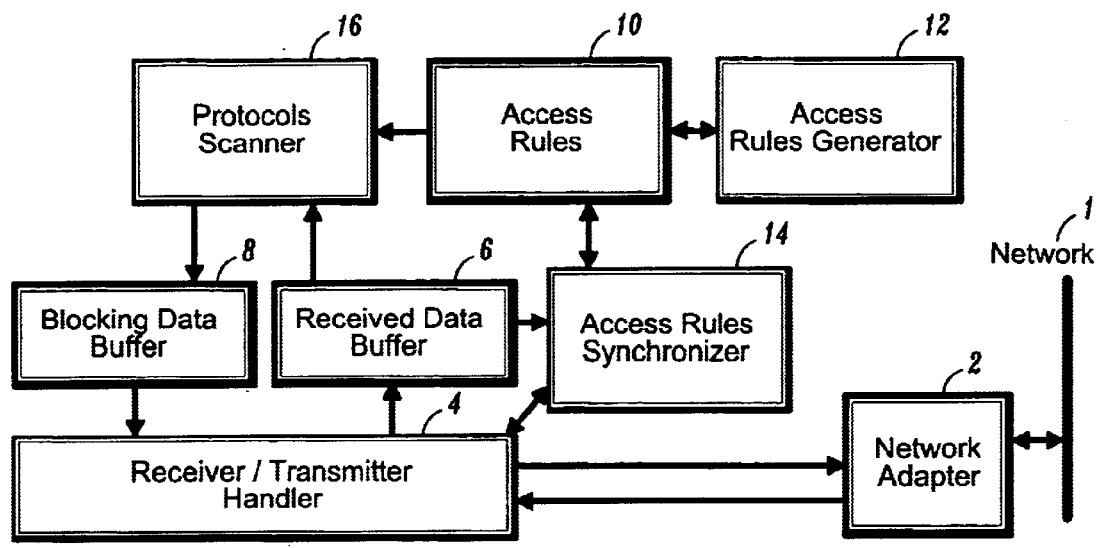
FIG. 1 illustrates the operation of a session wall as a block diagram.
Figure 2:
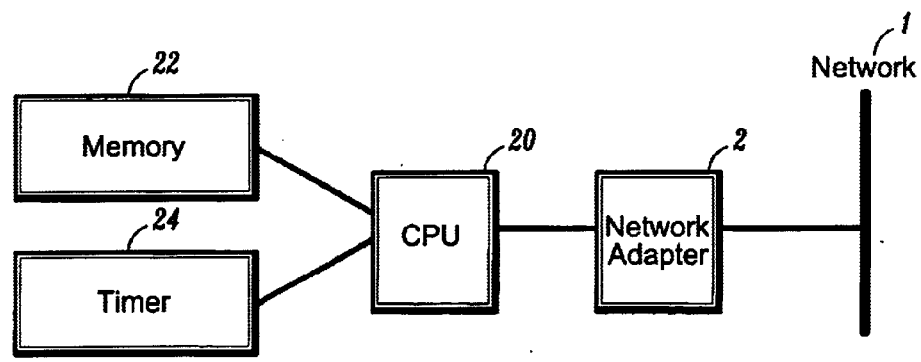
FIG. 2 illustrates various hardware components of a session wall device.

Referring now to the Figures, FIGS. 1 and 2 show Network Adapter 2 as part of a session wall device. The network adapter is a hardware component for attaching a session wall device to network 1. Network Adapter 2 receives network communication in several protocols simultaneously. Network Adapter 2 also transmits messages in several protocols.

FIG. 1 illustrates how, in operation, data is transferred from Network Adapter 2 to Receiver/Transmitter Handler 4. Receiver/Transmitter Handler 4 is a software logic that stores received network traffic in Received Data Buffer 6. Protocol Scanner 16 is a set of software routines that scans data in Received Data Buffer 6 and compares it with Access Rules 10 to determine whether the message is permitted or not. When Protocol Scanner 16 detects an event which is not permitted, Protocol Scanner 16 generates a message which will terminate the communication session in which that event took place. Protocol Scanner 16 stores that message in Blocking Data Buffer 8 and notifies Receiver/Transmitter Handler 4 that data should be transmitted. Receiver/Transmitter Handler 4 scans Blocking Data Buffer 8, and transmits data contained therein to network 1 via Network Adapter 2.

As mentioned above, if Protocol Scanner 16 detects that an event not permitted according to Access Rules 10 occurred over the network, a session wall issues a message which will terminate that communication session. Accordingly, a session wall sends a message to both parties involved in the session. In a message to the server, a session wall either notifies that the client wishes to close the current session, or it sends a specific "terminate session" message to the server using the particular communication protocol used by the server. That message causes the server to stop responding to additional client messages in that specific session. In the message to the client, a session wall either emulates data from the server causing the client to misinterpret it so future responses from the server for that session will not be accepted properly, or a session wall will notify the client that the server dropped the connection. According to yet another embodiment of the invention, a session wall sends the client a previously defined message to notify that the session was blocked.

According to further features in preferred embodiments of the invention described below, the session wall features an additional layer of session control. Accordingly, in cases when, due to malfunction or any other reason, the actions listed above are not performed the session wall injects a rapid succession of communication messages into the network that conform to the system protocol, so that any other device seeking to transmit will encounter a "collision." In order to prevent the network from being tied up indefinitely by such action, the session wall is additionally fitted with timer device 24 arranged to limit the number of consecutive messages that will be sent. Alternatively, the timer is realized as software executed by the processor.

Access rules 10 mentioned above are a table of groups of servers, groups of clients, and rules between them. The rules define actions which should take place when a specific set of protocols is used when two or more parties communicate, and also, when specific data content, or specific data sequences are passed over the network. The definition contains several logical and mathematical combinations after which a specific action is to be performed. For example, if a client is connecting to a Telnet server and is using an FTP session on that server, the session wall will issue a command to the Telnet server to terminate the FTP session. Another example is that if a client is limited to two concurrent sessions of Telnet and FTP together and he tries to open a third session, both server and client will get a message that the other party closed the connection in order to inhibit the third session.

The access rules are written to memory 22 in various ways, depending (among other things) on the level of security required. For example, a degree of security is achieved by allowing a learning period when the network is first set up. During this period the session wall "self-learns" the network topology (i.e. which devices send data from within the local network and which devices are connected from other segments), which devices are servers and which devices are clients, and which protocols are used between them, by passively listening to network traffic. According to one embodiment, the session wall is configured to automatically accept all existing access and thus set up its own access rules for each device forbidding new devices or new protocols. This is illustratively shown in FIG. 1 as Access Rules Generator 12. According to further features in preferred embodiments, more sophisticated rules are loaded (or self-learned rules are edited) using data provided as control frames from a network manager. If the possibility of the network manager being misused or counterfeited needs to be allowed for, the control frames are supplied from a special input device (not shown). The session wall device also features Central Processing Unit 20 for handling any processing tasks required during session wall operation.

Figure 3:
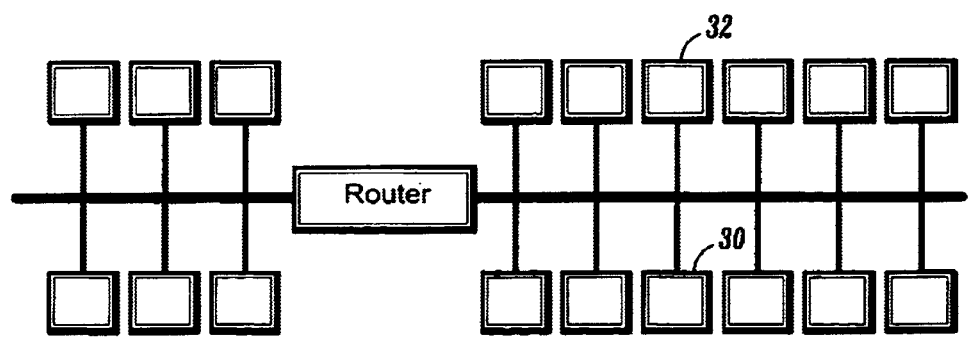
FIG. 3 illustrates a network configured with a plurality of session wall devices.

According to further features in preferred embodiments of the invention, several session wall devices perform a common task together. This is figuratively shown in FIG. 3 featuring session wall devices 30 and 32. To this end, the various session wall devices may be located on the same segment of a local area network (as shown in the Figure) or on different segments of a wide area network. In order to perform a common task, the session wall devices feature a secured protocol to communicate. Using this protocol they automatically maintain which device will perform which task. The access rules between the devices are shared via software illustratively shown in FIG. 1 as Access Rules Synchronizer 14. This software receives rules from other session wall products connected to the network and transmits access rules to other session wall products. In addition, Access Rules Synchronizer 14 also scans received data in order to automatically determine access rules and suggest them to be used. As mentioned above, in such a configuration each device is responsible for a portion of the rules. According to further features in this preferred embodiment, this configuration is used for backup purposes. Thus, if one device stops performing the other devices will automatically replace it, assuming that they have access to the same network segment.

It will be appreciated that the above descriptions are intended only to serve as examples, and that many other embodiments are possible within the spirit and the scope of the present invention.

What is claimed is:

1. For use in a computer network facilitating communication sessions between network devices, including at least one client, a session wall comprising:

(a) a network adapter for attaching the session wall to the network;

(b) data memory;

(c) a processor connected to said data memory and to said network adapter; and (d) a communication session control system wherein data pertinent to the control of at least one of the communication sessions is stored in said memory, a portion of said at least one session is read by said processor, said processor comparing said portion with a set of access rules stored in said memory, and, when said at least one session is not allowed according to said access rules, issuing a message to at least one of the network devices involved in said at least one session, wherein said message emulates a message using an inter-device communication protocol from a respective server, said message causing said client not to accept further responses from said server during said at least one session.

2. The session wall of claim 1, wherein said message features a notice that a respective server has ended said at least one session.

3. For use in a computer network facilitating communication sessions between network devices, a method of controlling the communication sessions, the method comprising:

providing network information;

providing access information;

reading a portion of at least one of the communication sessions;

comparing said portion with said access information;

when said at least one communication session is not allowed according to said access information, issuing a message to at least one of the network devices involved in said at least one session, said at least one of the network devices including at least one server.

4. The method of claim 3, wherein said message emulates a message from a respective client, said message causing said server to end said at least one session.

5. A computer recording medium including computer executable code for use in a computer network facilitating communication sessions between network devices, a computer executable code controlling the communication sessions, comprising:

code for providing network information;

code for providing access information;

code for passively listening to a portion of at least one of the communication sessions;

code for comparing said portion with said access information; and when said at least one communication session is not allowed according to said access information, code for issuing a message to at least one of the network devices involved in said at least one session to stop further communication between the network devices.

6. A computer recording medium including computer executable cord for use in a computer network facilitating communication sessions between network devices for controlling the communication sessions, the computer recording medium comprising:

code for providing network information;

code for providing access information;

code for passively listening to a portion of at least one of the communication sessions;

code for comparing said portion with said access information; and when said at least one communication session is not allowed according to said access information, code for issuing a message to at least one of the network devices, such as a client, involved in said at least one session to stop further communication between the network devices, wherein said message is a message emulated from a respective server using an inter-device communication protocol, said message causing said client not to accept further. responses from said server during said at least one session.

7. A computer recording medium including computer executable code for use in a computer network facilitating communication sessions between network devices, the computer recording medium comprising:

code for providing network information;

code for providing access information;

code for reading a portion of at least one of the communication sessions;

code for comparing said portion with said access information;

when said at least one communication session is not allowed according to said access information, code for issuing a message to at least one of the network devices involved in said at least one session, said at least one of the network devices including at least one server.

8. A method for use in a computer network facilitating communication sessions between network devices for controlling the communication sessions, the method comprising:

providing network information;

providing access information;

passively listening to a portion of at least one of the communication sessions;

comparing said portion with said access information; and when said at least one communication session is not allowed according to said access information, issuing a message to at least one of the network devices, such as a client, involved in said at least one session to stop further communication between the network devices, wherein said message is a message emulated from a respective server using an inter-device communication protocol, said message causing said client not to accept further responses from said server during said at least one session.

\* \* \* \* \*